United States Patent [19]

Kobayashi et al.

[11] Patent Number: 4,761,356
[45] Date of Patent: Aug. 2, 1988

[54] GRID FOR LEAD STORAGE BATTERIES

[75] Inventors: Yoshihiro Kobayashi, Hiratsuka; Tetsunari Kawase, Chigasaki, both of Japan

[73] Assignee: Matsushita Electric Industrial Co., Ltd., Osaka, Japan

[21] Appl. No.: 932,506
[22] PCT Filed: Feb. 26, 1985
[86] PCT No.: PCT/JP85/00088
§ 371 Date: Oct. 27, 1986
§ 102(e) Date: Oct. 27, 1986
[87] PCT Pub. No.: WO86/05031
PCT Pub. Date: Aug. 28, 1986

[51] Int. Cl.⁴ .............................. H01M 4/73
[52] U.S. Cl. ..................... 429/242; 429/245
[58] Field of Search ............ 429/245, 225, 242; 428/645, 615; 420/563, 570, 590

[56] References Cited

U.S. PATENT DOCUMENTS

| 2,011,613 | 8/1935 | Brown et al. | 428/615 |
| 4,107,407 | 8/1978 | Koch | 429/225 |
| 4,166,155 | 8/1979 | Mao et al. | 429/245 X |
| 4,279,977 | 7/1981 | Matter | 429/245 |

FOREIGN PATENT DOCUMENTS 2721560 11/1978 Fed. Rep. of Germany .
86/03343 6/1986 PCT Int'l Appl. .

OTHER PUBLICATIONS

Patents Abstracts of Japan, vol. 9, No. 89 (E-309) [1812], 18th Apr. 1985; & JP-A-59 217 947 (Furukawa Denchi K.K.) 08-12-1984.
Patents Abstracts of Japan, vol. 4, No. 71 (E-12) [553], 24th May 1980; & JP-A-55 39 141 (Yuasa Denchi K.K.) 18-03-1980.
Patents Abstracts of Japan, vol. 9, No. 159 (E-326) [1882], 4th Jul. 1985; & JP-A-60 37 663 (Matsushita Denki Sangyo K.K.) 27-02-1985.
Patents Abstracts of Japan, vol. 9, No. 165 (E-327) [1888], 10th Jul. 1985; & JP-14 A-60 39 7666 (Matsushita Denki Sangyo K.K.) 01-03-1985.
Patents Abstracts of Japan, vol. 10, No. 179 (E-414) [2235], 24th Jun. 1986; & JP-A-61 27 066 (Matsushita Electric Ind. Co. Ltd) 06-02-1986.
Patents Abstracts of Japan, vol. 10, No. 251 (E-432) [2307], 28th Aug. 1986; & JP-A-61 80 756 (Matsushita electric Ind. Co. Ltd) 24-04-1986.

Primary Examiner—Anthony Skapars
Attorney, Agent, or Firm—Lowe, Price, LeBlanc, Becker & Shur

[57] ABSTRACT

This invention relates to a grid for a lead storage battery which comprises a network unit (5) formed from a lead alloy sheet (1) of a first alloy layer (2) of a lead-calcium alloy and a second alloy layer (3) of a lead-tin alloy having a higher concentration of tin than the first alloy layer, the first alloy layer (2) and the second alloy layer (3) being exposed at slits of the network unit.

The use of such a grid can provide a lead storage battery which has both good maintenance-free characteristics inherent to the lead-calcium alloy and good recovery after overdischarge resulting from the second alloy having a high concentration of tin. Thus, the storage battery is highly reliable.

6 Claims, 2 Drawing Sheets

GRID FOR LEAD STORAGE BATTERIES

TECHNICAL FIELD

This invention relates to an improvement in a grid for lead storage batteries and more particularly, to an improvement in part of exposed surfaces of a grid consisting of a lead-calcium alloy whereby the drawbacks of a so-called calcium-type sotrage battery using a lead-calcium alloy can be overcome and, thus, the storage battery becomes highly reliable.

TECHNICAL BACKGROUND

Lead storage batteries have a grid as a support for plates so as to ensure current collection and keep active substances in accordance with the shape of the plate. In recent years, there is a high tendency to use lead-calcium alloys as the grid in view of the fact that they have good maintenance-free characteristics. The lead-calcium alloys have higher melting points and poorer productivity by a casting system than conventionally employed lead-antimony alloys. Accordingly, it is ordinary to form a network porous material for keeping an active substance by punching an alloy sheet or by an expanding system in which an alloy sheet is slit in large number and expanded or spread.

The lead-acid batteries of the calcium alloy type exhibit good maintenance-free characteristics but have several drawbacks. One such drawback is a poor recovery property after overdischarge. The term "recovery property after overdischarge" used herein is intended to means the capability of recovering a capacity when a lead-acid battery is allowed to stand after complete discharge and is subsequently charged. For instance, a lead-acid battery which is employed in motorcars is often in a fully discharged condition in order to fulfill car functions by application of an electric current, e.g. a room light or a small light may be kept on over a long time by mistakes such as the door kept opened partially or the light not switched off, or a number of auxiliary devices or accessories having computer circuits are mounted. When the current application is continued over a long time under these conditions, the calcium-type battery increases in impedance. This may not be recovered by means of an ordinary constant potential charger.

Moreover, if a motorcar would be difficult to start and the start would become possible by charge from other motor vehicles, the battery would be difficult to recover by charge during traveling. With a gas absorption-type closed lead-acid battery which is used as a power source for general electric appliances, it is not always re-charged after use and may be in a condition which does not allow recovery as discussed above.

The above phenomenon has been confirmed as ascribed to the fact that the lead-calcium alloy used as the grid is exposed to an electrolytic solution which has been diluted by discharge and has a composition close to water, and reacts with remaining lead dioxide to form, on the surfaces of the alloy, a layer of lead oxide ($PbO_x$ in which $x=1-2$) having a high impedance.

It is usual to use about 0.03–0.15 wt % of calcium in this type of lead-calcium alloy in order to impart a suitable degree of expandability. In addition, 0.3–3.0 wt % of tin is also added so as to impart ductility. In a range where the concentration of tin is low, the oxide layer becomes dense at the time of overcharge, the corrosion and intergranular corrosion resistances are good, and the alloy tends to embrittle. On the contrary, if the concentration of tin is too high, a suitable degree of hardness cannot be expected and the alloy cannot stand deformation when oxidized. For these reasons, it has been generally accepted that the use of tin in the above range is essential. However, the problem of overdischarge has been recently closed up and it has been made clear that the overdischarge problem cannot be overcome in the above range of the concentrations. Thus, the poor recovery under overdischarge conditions has been misunderstood as an inevitable drawback inherent to calcium-type lead-acid abtteries.

DISCLOSURE OF THE INVENTION

The present invention has for its object the provision of a calcium-type lead-acid battery which can solve the problem of the overdischarge while keeping good maintenance-free characteristics.

A grid according to the invention comprises a lead alloy sheet which has a first lead-calcium alloy layer and a second lead-tin alloy layer having a higher concentration of tin than the first alloy layer, the layers being integrally combined along the thickness as multilayers, the alloy sheet having a network structure for maintaining an active substance formed by a punching (metal punching) or metalexpanding work so that the first and second alloy layers are invariably exposed at portions where slit or cut in the network structure.

While the productivity is maintained at a higher level than as will be experienced in known sheets of uniform composition, the problem of the recovery after overdischarge which has been believed as not overcome by the clacium-type batteries can be solved according to the present invention.

In the fundamental form of the multi-layered structure, either the first alloy layer or the second alloy layer may be thicker, or the order of formation of the layers may not be critical. In view of the practical productivity, it is better to form the lead-calcium alloy layer (which may further comprise additives such as aluminum, copper and sulfur, if necessary) as a principal material for the sheet. With a known layer of a uniform composition having a concentration of tin less than 0.3 wt %, the oxide layer is so dense that the passive phenomenon is liable to occur and, thus, such a concentration has not been used. According to the invention, however, the passivation is prevented by the action of the second layer. Thus, the good corrosion resistance of the dense oxide layer can be positively utilized, ensuring a high over-all performance. The leadcalcium-tin alloys used may be selected from a wide range of compositions as in known sheets of uniform compositions.

Attention should be paid to the second alloy layer with respect to the content of tin. The second alloy layer should contain a larger amount of tin than at least the first alloy layer, by which the defects involved in the first alloy layer can be, more or less, mitigated. Remarkable effects are shown only when the content of tin exceeds 3 wt % which has never been used in the prior art single layer. Especially, at 5 wt % or so, the problem of the overdischarge can be completely solved. Because the fundamental strength of the sheet can be based chiefly on the the first alloy layer, the second layer does not necessarily contain calcium. For the formation of a multilayered structure, it is preferred that the second layer does not contain calcium which is susceptible to oxidation. Moreover, the second layer should rather be free from calcium for the reason that such a layer is ductile and follows deformation of the first alloy layer with a less danger of cleavage or delamination. On the other hand, the upper limit on the content of tin is as follows; when the content exceeds about 30 wt %, the degree of self-discharge tends to increase to a slight extent but is not vital. However, when it exceeds 70 wt %, short-circuiting is apt to take place because of the formation of dendrite from dissolved tin when the second alloy layer is formed on the surface. Accordingly, a preferable range of tin is 3–70 wt %.

In the practice of the invention, it is important that when the sheet is processed in the form of a network, the first and second alloy layers be exposed at the slits or cut portions. This gives a greater effect than in the case where the content of tin in the lead-calcium-tin alloy merely increases in the layer of a uniform composition. This means that it is unnecessary to use expensive tin in large amounts and reduce the first lead-calcium alloy layer exhibiting good maintenance-free characteristics. More particularly, the first alloy layer is used as a base alloy which is necessary on processing and in view of the good maintenancefree characteristics. The second layer can be formed as a very thin layer on the surface of the first layer. To this end, a slab is prepared from a composition for the first alloy layer and is subsequently dipped, within a short time, in an molten alloy bath for the second alloy layer. Alternatively, a molten alloy may be spray-coated or plated on the slab. In this manner, a second alloy thin layer having a thickness of from several ten micrometers to several hundred micrometers is formed on the slab. The thus formed slab is rolled at a rolling rate of 10 to 20 times, so that a several micrometers to several ten micrometers thick second alloy layer can be formed on the surface of an about 1 mm thick sheet.

For the above surface processing, it should be noted that since the lead-calcium alloy generally tends to harden by aging, a second alloy layer of different properties is formed during the chemical conversion process and the bonding force for the formation of a recrystalline structure with the first layer is higher, so that the surface treatment is preferably effected within about 500 hours after the formation of the slab and the rolling is also preferably effected within about 500 hours after the surface treatment.

BRIEF DESCRIPTION OF THE DRAWINGS

The following is a list of reference numerals utilized in the drawings.

1 ... Lead Alloy Sheet
2 ... First Alloy Sheet
3 ... Second Alloy Sheet
4 ... Non-developed Portion
5 ... Network Portion

BEST MODE FOR CARRYING OUT THE INVENTION

Figure 1:
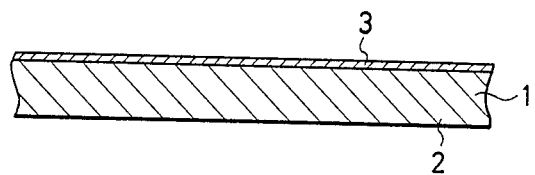
FIG. 1 is a lead alloy sheet used in the present invention in which FIG. (a) shows a sheet obtained by forming a second alloy layer having a higher content of tin on one side of a first alloy layer and FIG. (b) shows a sheet having a first alloy layer and second alloy layers formed on opposite sides of the first alloy layer.
Figure 1:
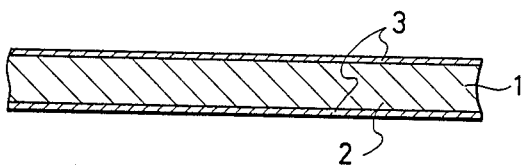
Figure 2:
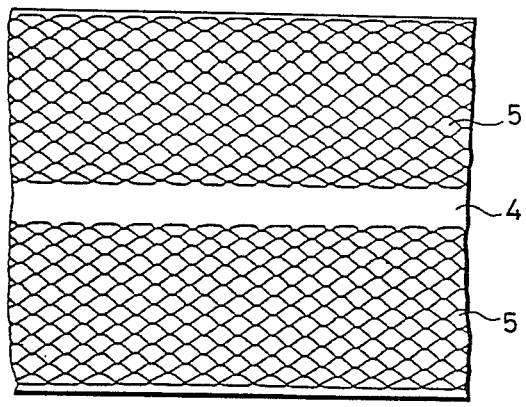
FIG. 2 is a schematic top view of the sheet of FIG. 1 which has been expanded.

FIG. 1 shows a lead alloy sheet 1 used in the present invention, in which FIG. (a) shows an embodiment which includes a first alloy layer 2 having a second alloy layer 3 having a higher content of tin only on one surface of the alloy layer 2 and FIG. (b) shows another embodiment in which the second alloy layers are formed on both sides of the first layer 2. If technical problems are solved, it is possible to form the first layer 2 and the second layer 3 in a reverse order. FIG. 2 shows the sheet 1 which has been expanded to have a non-developed portion 4 at the center thereof and network portions 5, 5 at opposite sides of the portion 4. While an upper frame and tabs for current collection are formed from the non-developed portion 4, a plate piece of a desired size and form is cut away from the network portion 5 to form a grid. The network portion 5 of the grid has invariably the first layer, the second layer and the boundary therebetween exposed at the respective slits.

A method for fabricating the grid is particularly described.

A molten lead alloy is subjected to continuous casting to form a slab (thickness 10 mm) of an arbitrary leadcalcium alloy consisting of $0.08 \pm 0.01$ wt % of calcium, 0–1.5 wt % of tin and the balance of lead. The slab is then continuously dipped in a molten lead-tin alloy bath for forming the second layer. Immediately, the surface is smoothed, followed by rolling into a 1.1 mm thick sheet by means of multi-stage rollers. The resultant sheet has such a construction as shown in FIG. 1b in which the first layer 2 has a thickness of about 1.0 mm and the second layers 3 formed on the opposite sides have, respectively a thickness of 50 micrometers.

It will be noted that the alloy composition for the second layers comprises from 0.1 wt % to 80 wt % of tin, to which calcium is not added or 0.08 wt % of calcium is added.

The sheet is used to form a continuous expanded metal as shown in FIG. 2, after which an active substance paste is applied to the expanded metal in a usual manner and the applied metal is cut in the form of a plate. These plates are used to form a lead-acid battery having a rated capacity of 30 Ah (5 hours).

An electric bulb having ratings of 12 V and 10 W was connected to the lead-acid battery as a load, and the battery was allowed to stand overdischarged for 14 days at 40° C. Thereafter, the battery was placed at normal temperatures and charged for 4 hours by means of a constant voltage charger at an output voltage of 14.8V (maximum current of 25 A).

Figure 3:
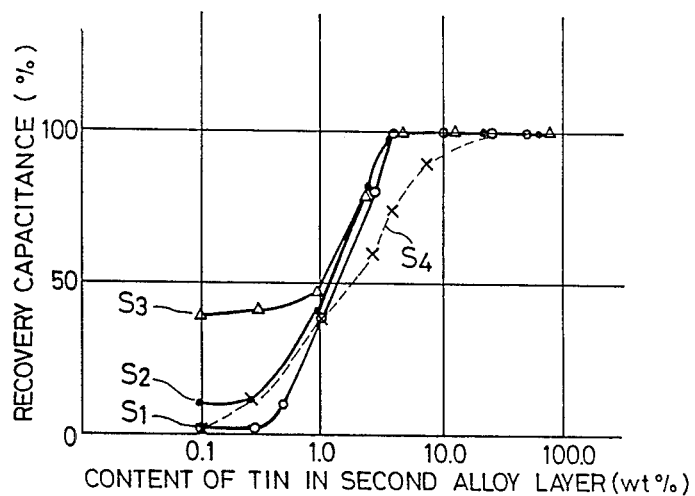
FIG. 3 is a graphical relation between a concentration of tin in the second alloy layer on the sheet surface and a recovering rate of capacitance after overdischarge.

Thereafter, the rapid discharge characteristic of 150 A was determined at $-15°$ C. and compared with capacity before the overdischarge. The ratio of a capacity after the overdischarge to the thus determined initial value was taken as a recovery capacity (%). The relation with a concentration of tin in the second layer is shown in FIG. 3.

In the figure, $S_1$, $S_2$ and $S_3$ are, respectively, contents of tin in the first layer of 0.1 wt %, 0.3 wt % and 1.0 wt %. For comparison, a known layer of a uniform composition in which a surface concentration of tin is increased is shown as $S_4$.

As will be apparent from the figure, the recovery after overdischarge is remarkably improved as the concentration of tin in the second surface layer increases. Especially, when the tin concentration of the second layer is higher than that of the first layer, a greater improvement is achieved. The comparison between $S_1$–$S_3$ and $S_4$ reveals that the reason why the former are better is based not only on the high concentration of tin on the grid surface, but also on the exposure of the first and second layers at the slits of the grid and the boundary between the layers.

Figure 4:
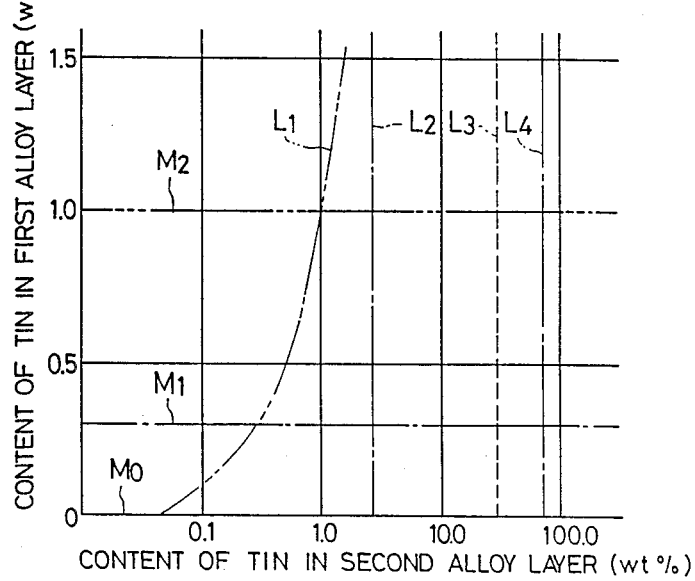
FIG. 4 is a graphical relation between a concentration of in the second alloy layer on the sheet surface and a concentration of tin in the first alloy layer used as a base alloy.

FIG. 4 is illustrative of an effective range of the tin concentration in the present invention. In the figure, $L_1$ indicates a curve at which concentrations of tin in the first and second layers are equal to each other. In a region where the concentration of tin in the second layer is higher than that of $L_1$, the effect of the invention is shown. $L_2$ indicates a tin concentration of 3 wt % in the second layer and the effect of the invention are very remarkable in a range of a higher tin concentration. $L_3$ indicates a tin concentration of 30 wt % in the second layer. In a larger range of the tin concentration, self-discharge may increase to a slight extent and the maintenance-free characteristic lowers by about 10%. $L_4$ indicates a tin concentration of about 70 wt % and, if the tin concentration further increases, the tin in the second layer separates from the second layer, so that short-circuiting is liable to occur because of the formation of dendrite.

With regard to the concentration of tin in the first layer, tin can be effectively utilized when it is used in a range not larger than 0.3 wt % as expressed by $M_0$–$M_1$ which has been not used in prior art. Moreover, above the $M_1$ line at which the concentration of tin is 0.3 wt % which has been conventionally employed, the present invention is effective. However, if the concentration of tin in the first base layer is increased over a $M_2$ line at which the concentration is 1.0 wt %, the expandability may sometimes lower in a slight degree.

It will be noted that the technique of the invention is effective when applied to a positive electrode and may be used even for a negative electrode.

INDUSTRIAL UTILIZATION

As will be appreciated from the above description, the present invention overcomes the problem of the recovery after overdischarge which has been considered to be an inevitable drawback inherent to conventional clacium-type lead-acid batteries and can thus provide a lead-acid battery which has good amintenance-free characteristics and is highly reliable as an electric source.

What is claimed is:

1. A grid for a lead storage battery which comprises a network unit formed from a lead alloy sheet of an integral combination of a first alloy layer of a lead-calcium alloy and a second alloy layer of a lead-tin alloy whose concentration of tin is higher than that in the first alloy layer, the first alloy layer and the second alloy layer being exposed at slits of the network unit.

2. A grid for a lead storage battery according to claim 1, wherein said first alloy layer is a base and said second alloy layer is formed on at least one side of said first alloy layer.

3. A grid for a lead storage battery according to claim 1, wherein said first alloy layer consists essentially of a lead-calcium-tin alloy.

4. A grid for a lead storage battery according to claim 1, wherein said second alloy layer is a lead-tin alloy free from calcium.

5. A grid for a lead storage battery which comprises a network unit formed from a lead alloy sheet of an integral combination of a first alloy layer of 0.03–0.15 wt % of calcium, 0–1.5 wt % of tin and the balance of lead and a second alloy layer of 3–70 wt % of tin and the balance of lead, the first alloy layer and the second alloy layer being exposed at slits of the network unit.

6. A grid according to claim 5, wherein a content of tin in the first alloy layer is not larger than 0.3 wt % and a content of tin in the second alloy layer is not less than 5 wt %.

* * * * *